United States Patent [19]

Coale

[11] Patent Number: 4,922,491
[45] Date of Patent: May 1, 1990

[54] INPUT/OUTPUT DEVICE SERVICE ALERT FUNCTION

[75] Inventor: Jerry L. Coale, Aptos, Calif.

[73] Assignee: International Business Machines Corporation, Armonk, N.Y.

[21] Appl. No.: 239,154

[22] Filed: Aug. 30, 1988

[51] Int. Cl.5 ............................................. G06F 11/00
[52] U.S. Cl. .................................. 371/16.1; 371/16.5; 371/29.1
[58] Field of Search ................... 371/16.5, 29.1, 15.1, 371/16.1, 16.4, 19, 17, 18

[56] References Cited

U.S. PATENT DOCUMENTS

| | | | |
|---|---|---|---|
| 3,873,819 | 3/1975 | Greenwald | 371/16.5 |
| 3,904,860 | 9/1975 | Huber | 371/16.5 |
| 4,549,296 | 10/1985 | Castel | 371/16.5 |
| 4,586,147 | 4/1986 | Tadokoro | 371/29.1 |
| 4,745,602 | 5/1988 | Morrell | 371/29.1 |

OTHER PUBLICATIONS

J. L. Coale, IBM Disc Storage Technology, Copyright International Business Machines Corp., 1980, pp. 59-61.

*Primary Examiner*—Michael R. Fleming
*Attorney, Agent, or Firm*—David J. Arthur

[57] ABSTRACT

A method of automatically detecting and analyzing exception events occurring in a computer peripheral subsystem connected to a host computer system includes maintaining a Subsystem Environment data base comprising information relating to the current configuration of the computer peripheral subsystem, and usage and error information relating to the peripheral subsystem. A Problem Description procedure is conditionally invoked when the data in the Subsystem Environment data base reflects an exception event that indicates either a clear or a probable need for service attention to the peripheral subsystem. The Problem Description procedure includes creating from stored rules a view of the Subsystem Environment data base relevant to the exception event, and developing a Problem Profile (record) describing the exception event. The Problem Profile record is compared to the Problem Profile data base to determine if the current exception event relates to a problem already recorded in the data base. If a match is found, the matching record is updated with new information from the current record. Otherwise, the current record is entered as a new problem. If the Problem Profile indicates that the exception event is a repeat of a problem already recorded in the Problem Profile data base, the matching profile record is updated to reflect the new Problem Profile data. A Problem Evaluation procedure is conditionally invoked. The Problem Evaluation procedure is not invoked if the updated problem record (not the new Problem Profile) from the Problem Profile data base has already been reported to the host system and a service action is pending. If operations of the peripheral subsystem have been disrupted or degraded beyond the limits of acceptable subsystem performance, a service alert message is generated. The service alert message is inserted into the Problem Profile record in the Problem Profile data base, and the service alert message is transmitted to the host system. The service alert message contains a variety of information for the subsystem user and for the repair technician.

11 Claims, 5 Drawing Sheets

FIG. 1    (PRIOR ART)

INPUT/OUTPUT DEVICE SERVICE ALERT FUNCTION

FIELD OF THE INVENTION

The present invention relates to automatic equipment analysis, and particularly to the service support requirements of computer input/output (I/O) devices that have built-in error detection and error recovery capabilities.

BACKGROUND OF THE INVENTION

The present invention will be described in connection with a computer disk file subsystem for data storage. Such a storage device may be referred to as a Direct Access Storage (DAS) subsystem. Nevertheless, those skilled in the art will recognize that the invention described may be incorporated into other computer devices, and particularly into various I/O devices having built-in error detection and recovery capabilities.

The occurrence of a recovered I/O device error event may or may not indicate that a service action is required to restore normal operation. If I/O device performance is permanently degraded due to an error event, or if error events recur often enough to noticeably degrade I/O device performance, then a service action should be scheduled. However, a service action is typically not recommended if I/O performance is not noticeably degraded.

The decision whether or not a service action is required is typically made through a manual and emperical process. Detailed error symptom reports are called up and examined to determine some degree of problem severity and permanence effecting machine operation. Because of this complicated process, the decision to call or not call for service action is often based on an inaccurate understanding of the real problem. An incorrect decision can be costly in terms of either lost performance or the replacement of non-defective parts.

The service action decision process to isolate the cause of a possibly very intermittent or usage pattern sensitive fault is also typically conducted through a manual and emperical evaluation process. The preferred prior art fault isolation technique is to use maintenance diagnostic programs to recreate an error symptom. However, this technique is inefficient at recreating intermittent error symptoms. An alternative is to manually analyze error symptom history data to derive a fault syndrome that can be equated to a probable service action. The service action then is to systematically replace suspect parts until error events are no longer reported, as an indication that normal operation has been restored.

An input/output (I/O) device 11 of the prior art is shown with its error response mechanism 13 in FIG. 1. The I/O device receives an I/O operation command to read or write data. If the I/O device successfully completes the operation, it can respond that the operation has been completed without error (response (1)). If, however, an error is detected, the I/O device proceeds with its error symptom analysis and error recovery procedure, and either recovers successfully, or fails to recover. If the operation is successfully recovered, it can transmit a command response that the operation is complete, but reporting a recovered error symptom (response (2)). If the operation is not recovered, the I/O device issues a command response that the operation is incomplete, and includes a damage report and a report of the non-recovered error symptom (response (3)).

When the I/O device reports successful completion of the operation without error, that condition reflects normal machine operation. A report of operation complete, but with a recovered error symptom report indicates that the I/O device operations can continue, but that the error symptom data should be examined to determine if a service action is required. A report that the operation is incomplete, with the damage report and the non-recovered error symptom requires immediate attention to restore normal I/O device operation. A service action may or may not be required as a result of either of the error symptom reports. Any service action requirement must be determined external to the I/O device by manual analysis of error symptom data.

For example, in a DAS subsystem of a computer system, as the user performs write and read operations, transferring data to and from the subsystem, the disk file will periodically, in the manner known, generate a data check message or an equipment check message indicating that some other than routine event has occurred. Data checks are, in many disk files, somewhat expected events, and thus are counted and recorded in ordinary bookkeeping associated with the DAS subsystem, and may not indicate that a service action is required.

Usage data related to the DAS subsystem is also accumulated. Such data might include which I/O devices are being used, seek counts, and data transfer accounts. This is sometimes referred to as usage information.

Conventionally, a report is generated periodically (such as daily or weekly) noting all of the recovered exceptions or other potential error events that occurred since the last reporting took place. A person will analyze this report to determine if the events recorded represent a problem with the I/O device, and whether corrective action is needed, and what that corrective action might be. Nevertheless, under current systems, this analysis must be performed using only the printed reports to note exception events and detect trends in error events.

SUMMARY OF THE INVENTION

Figure 1:
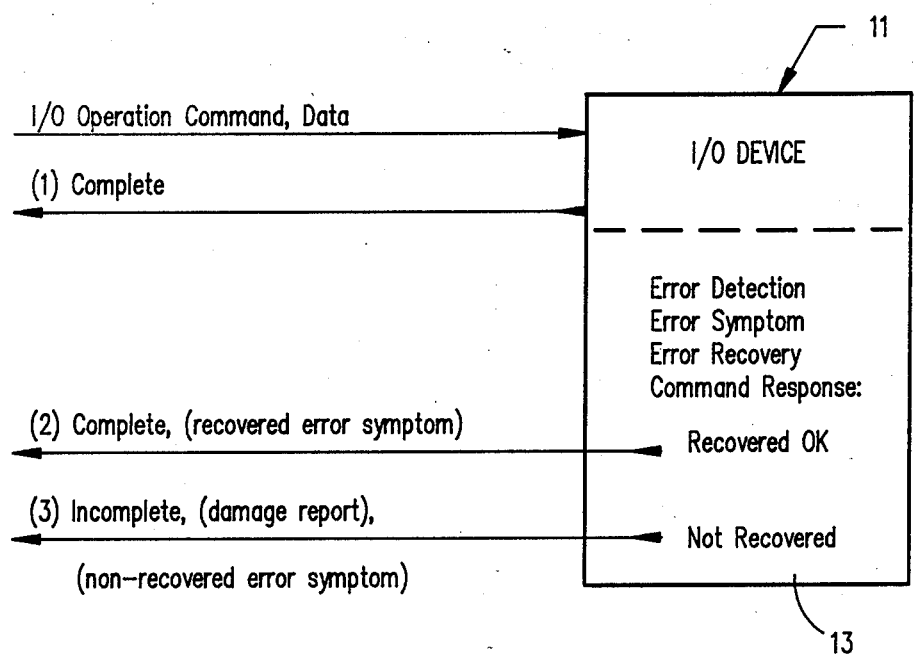
FIG. 1 is a block diagram of an I/O device having an error recovery mechanism, illustrating the types of status responses that can be made to an I/O operation command.

The present invention eliminates the need for an external manual process to determine service action requirements. The external manual process is replaced by a service alert function that is built into the I/O device. The service alert function operates concurrent with other I/O device functions. The internal service alert function of the invention monitors device I/O operations and records exception event records to detect a fault syndrome that requires a service action, determine service action requirements, and initiate a service action via an asynchronous service alert message to the I/O device attachment.

The present invention is a method of automatically detecting and analyzing exception or error events occurring in a computer peripheral subsystem connected to a host computer system. The method of the invention includes maintaining a Subsystem Environment data base comprising information relating to the current configuration of the computer peripheral subsystem, and usage and error information relating to the peripheral subsystem.

A Problem Description procedure is conditionally invoked when the data in the Subsystem Environment data base reflects an exception event that indicates either a clear or a probable need for service attention to the peripheral subsystem. The Problem Description procedure includes creating from stored rules a view of the Subsystem Environment data base relevant to the exception event, and developing a current Problem Profile record describing the exception event.

A Problem Profile data base comprising Problem Profile records of previously occurring exception events is scanned to relate the current Problem Profile record to a Problem Profile record that already exists in the Problem Profile data base. If the current Problem Profile record matches an existing Problem Profile record in the Problem Profile data base, and the existing Problem Profile record indicates that a service action is pending for the covered problem, the existing Problem Profile record is updated. If the current Problem Profile record matches an existing Problem Profile record in the Problem Profile data base, and the existing Problem Profile record indicates that a service action is not pending for the covered problem, the existing Problem Profile record is updated and a Problem Evaluation procedure is invoked. If the current Problem Profile record does not match an existing Problem Profile record in the Problem Profile data base, the current Problem Profile record is added to the Problem Profile data base.

In the Problem Evaluation procedure, the current Problem Profile record is examined in view of stored rules relating to acceptable subsystem performance. If operations of the peripheral subsystem have been disrupted or degraded beyond the limits of acceptable subsystem performance, a service alert message is generated. The service alert message is inserted into the Problem Profile record in the Problem Profile data base. The existing Problem Profile record in the Problem Profile data base is updated, and the service alert message is transmitted to the host system.

DETAILED DESCRIPTION OF THE PREFERRED EMBODIMENT

Figure 2:
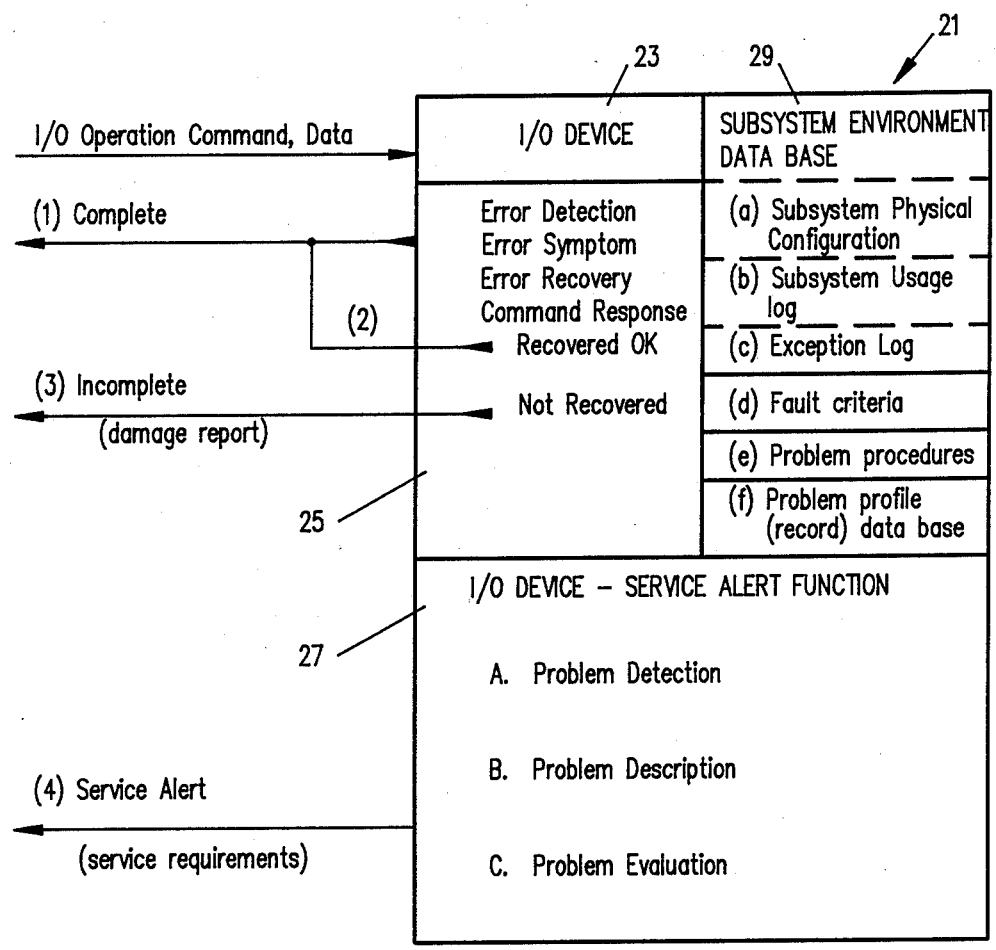
FIG. 2 is a block diagram of an I/O device including the service alert function of the invention.

As illustrated in FIG. 2, a computer peripheral subsystem 21 includes one or more input/output (I/O) devices 23 for receiving operation commands and data from the host computer system. The maximum is typically 64 devices per 7 a subsystem. The subsystem additionally includes an error detection and recovery mechanism 25. As in the prior art, if the operation is successfully completed, a response that the operation was completed without error is generated (response (1)). If, however, an error is detected, the I/O device internal error detection, determination, and recovery mechanism 25 is invoked. The error detection, determination, and recovery mechanism 25 is typically common for all the devices in the subsystem. If the error is successfully recovered, an operation complete message is transmitted, but without recovered error symptom message (response (2)). Thus, to the host computer system, responses (1) and (2) are one message. Any difference is only seen as a difference in command response time. When an operation is incomplete because the error was not successfully recovered, a message indicating incomplete operation, and a damage report are provided by the I/O device (response (3)). In both of the cases in which an error is detected, error symptom data is used only internally by the I/O device service alert function 27. The service alert function conditionally produces an asynchronous service alert message that contains all of the service action requirements necessary to restore normal I/O device operation. A subsystem memory 29 stores data representing the subsystem physical configuration, a subsystem usage log, an exception event log, fault criteria, problem procedures, and a Problem Profile (record) data base. Together, the subsystem physical configuration, the subsystem usage log, and the exception event log form a Subsystem Environment data base.

SERVICE ALERT MESSAGE GENERATE PROCESS

The service alert function 27 is a programmed facility that interfaces with I/O devices in the subsystem to receive detailed input data from the subsystem. The Service Alert Message Generate process is carried out by the service alert function 27 and is partitioned into three principal procedures:

1. Problem Detection is a "never ending" subsystem program that manages a Subsystem Environment data base, such that the data base always describes the current configuration, usage, and error environments for the Direct Access Storage (DAS) subsystem. A Problem Description procedure is conditionally invoked whenever the Subsystem Environment indicates either a clear or probable need for subsystem service attention.

2. The Problem Description procedure CREATES a VIEW of the Subsystem Environment data base, such that the view is relevant to the current exception boundary within the subsystem. Information from the exception boundary view is used to develop a Problem Profile that efficiently describes the current problem state for the subsystem. This profile information is either INSERTED into the Problem Profile data base as a "new problem" record, or used to UPDATE another record describing a previous detection of the same problem condition. A Problem Evaluation procedure is invoked whenever the problem state is determined to be "new" or "recurrent". Problem Evaluation is not invoked if the detected problem has already been reported to a host system and service action is pending.

3. The Problem Evaluation procedure first determines Fault Isolation, Fault Severity, and Service Requirements for a Problem Profile record. This information is JOINED with the Problem Profile record in the data base. IF Problem Evaluation concludes that system operations have been disrupted OR degraded beyond the limits of acceptable subsystem performance THEN service alert message Sense Data is generated, JOINED with the Problem Profile record and also reported to a host system so as to initiate a service action.

PROBLEM DETECTION PROCEDURE

The Problem Detection Procedure monitors DAS subsystem activity with respect to changes in subsystem configuration, such as unit install/remove, data format mode change, Engineering Change install, and resource fence/spare due to fault condition; also, seek/read/write usage of subsystem control paths and devices; and subsystem exception activity caused by error conditions detected and handled during the processing of system tasks. The monitored data is retained in a Subsystem Environment data base that always describes the current subsystem configuration, usage and error status for the DAS subsystem.

The Problem Detection procedure is more explicitly described by the pseudo code sequence included in Appendix 1. The Problem Detection mechanism is illustrated schematically in FIG. 3.

During normal (error free) operation, the Problem Detection stage does "housekeeping" so as to maintain the normal (model) description of the subsystem environment.

Current usage information is received from the disk storage subsystem as an Input Log Record. The current time is applied to the Input Log Record, to place a time mark on the data. Also combined with the Input Log Record is selected historical information from the Subsystem Environment data base. The combined information is read into the current event and trend portion 43 of the Subsystem Environment data base 29(a)(b)(c).

Thus, stored in the subsystem usage log or data base (which is a portion of the Subsystem Environment data base), is information relating to which devices are used, which devices are used more heavily than others, which are used consistently at a certain level, which have intermittent periods of high use, and other information relating to the distribution and amount of usage of the devices in the system. Such information is important to assist in the determination of the nature of failures or exceptions that may be reported by the subsystem. A portion of the data base stores current use rate patterns.

The current time and current use report information (Input Log Record) is read into the current event and trend portion 43 of the subsystem usage data base memory 29(a)(b)(c). The current use rate pattern also becomes a part of the subsystem usage or history data base or log. A relational view 47 is applied to the Subsystem Environment data base to provide a relational configuration and usage history. Thus, the new usage data is always being examined for trends or patterns in view of the subsystem physical configuration and previous usage history. This creates a continuously updated record of subsystem usage and trends and patterns in subsystem usage.

The relational view 47 is developed according to rules 45 stored in a rules memory, which is a portion of the problem procedures 29(e). The Input Log Record is applied to the rules to generate the relational view instruction used to create the relational view 47 of the history data in the Subsystem Environment data base in view of the current use. Rule selection is determined by usage type (such as control unit, path, device data, or device access) and physical address boundary. The rules stored in the rules memory will be determined by expert input as to the way in which the history of usage in the particular device being analyzed should be examined. Thus, this information is entirely a function of the device being examined, and will differ for different devices and subsystems. The rules might specify that when a certain type of usage occurs, a specific portion of the usage data base might be called out as possibly or likely related to that usage.

An Input Log Record may also be supplied by the DAS subsystem when the subsystem physical configuration is changed. Such an Input Log Record is used to update the Subsystem Environment data base to reflect the current subsystem configuration.

When an "unexpected" exception event is input to the data base, a decision is made to either invoke or not invoke the Problem Description procedure.

Figure 3:
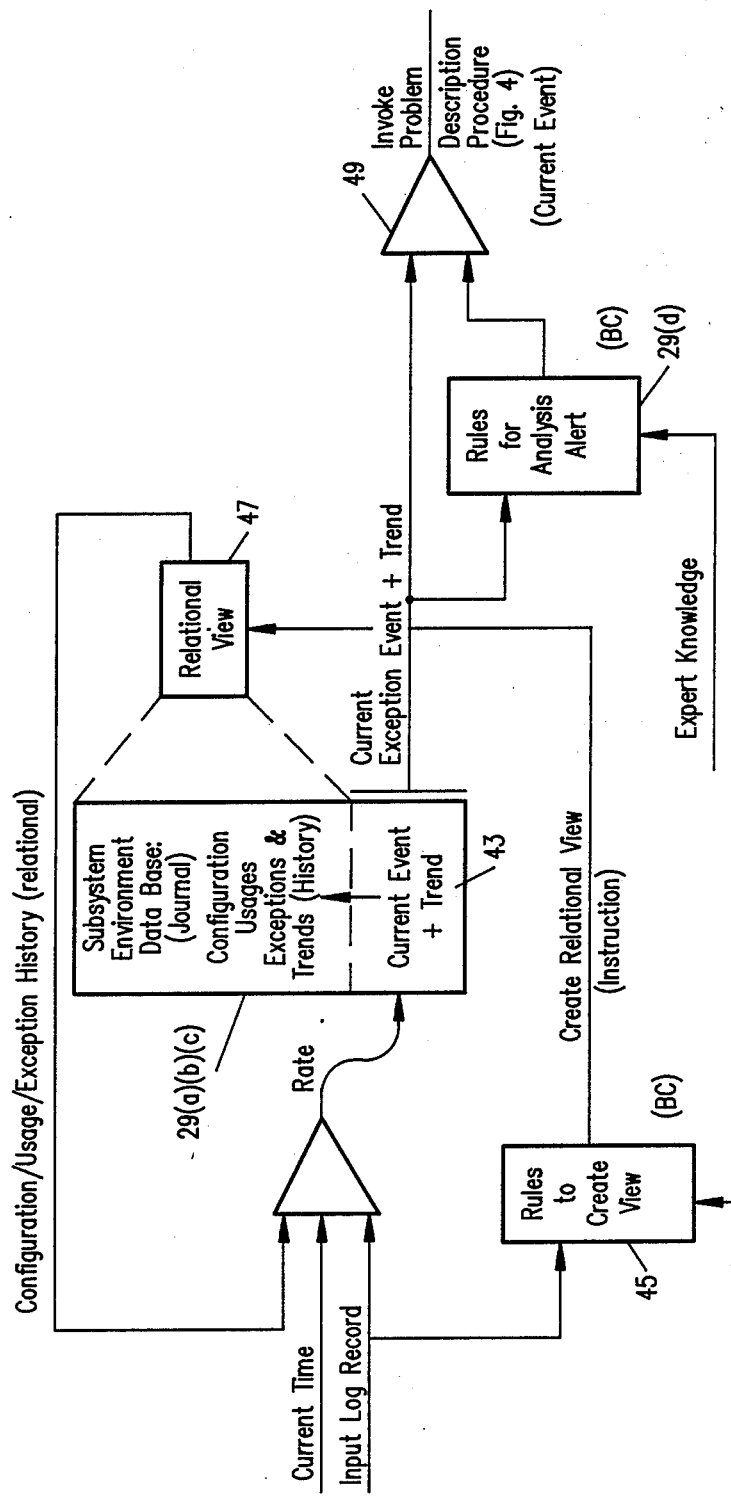
FIG. 3 is a conceptual diagram of the generation of the Subsystem Environment data base and the application of the Problem Detection Procedure.

FIG. 3 also presents a conceptual diagram of storing and analyzing data relating to exception event reports, or error reports, that may be received from various parts of the storage subsystem, such as the device, the channel, or the path from the channel to the device. A journal or data base 29(c) of exceptions and trends is developed and stored in the I/O device error event log memory. The log includes a subpart 43 containing the current exception event and trend information.

When a new exception event report is received (current exception event or current fault) as an Input Log Record, it is time stamped and recorded in the current exception event portion of the exceptions log or data base in the Subsystem Environment data base. The current exception event report is also applied to the set of rules 45 that have been previously stored in the device memory as part of the problem procedures 29(e). Those rules create an instruction representing relational view 47 to be applied to the Subsystem Environment data base in view of the Input Log Record containing the most recently received exception event report. When the Subsystem Environment data base is read through this relational view, history information is provided relative to the specific area of the machine that is of concern, as determined by the current exception event. This allows the determination to be made of how the new exception or failure or error relates to the past history of the subsystem and to the subsystem physical configuration. This is important in viewing and determining patterns and trends in the error reports. Applying this relational view to the Subsystem Environment data base, data related to the current event can be found and applied to the current exception or error event.

The rules 45 to create the relational view 47 of the Subsystem Environment data base are preferably accessed by the current exception event report in a backward chain manner so that the rules are addressed sequentially by the error event report. Operating in this manner, as is known, if the first rule is met and its condition satisfied, it will become the relational view instruction, while if it is not, the next rule is examined, and so forth. The order of the rules for examination, and the rules themselves are again a function of the device in which the service alert function is contained, and are generated with expert knowledge from persons intimately familiar with the error and exception characteristics of the particular I/O device.

The current error event, and current trend information, are applied to a set of rules for analysis alert 29(d), which rules contain fault criteria. The output of the rules for analysis alert controls a gate 49 for passing the current exception event and trend information to the next stage for problem description.

The decision to invoke the Problem Description procedure is clear if Exception Type indicates a "hard" fail. System operation is disrupted and service action is very likely to be necessary. More probable though are "soft" fail Exception Types that do not cause significant disruption, but can occur due to a repairable fault condition.

For "soft" fail exceptions, the decision to invoke Problem Description is made when the data base INSERT and UPDATE process detects a significantly recurring sequence of "soft" fail events that are related by symptom AND source. The objective is to not react to random non-recurring exception events, most probably caused by the external subsystem environment.

The fault criteria 29(d) may be set up as a backward chained set of rules for looking at the current event and trend. The rules should provide that when a "hard" failure is encountered (corrective action is needed to restore proper subsystem operation) or when a "soft, pattern threshold exceeded" exception condition is detected an Analysis Alert is generated and the gate 49 passes the current event and trend information to the Problem Description procedure. Expert knowledge of the subsystem being analyzed is required to generate a set of rules containing appropriate fault criteria. Generally, the chain will be ordered by exception priority so that the most severe fault symptom recognized fires first.

The rules for analysis alert should be established so that an analysis alert message is generated to pass the current exception event and trend information on to invoke the Problem Description Procedure more frequently than when there is truly a problem, so that the information can be further analyzed when there is any doubt.

PROBLEM DESCRIPTION PROCEDURE

Figure 4:
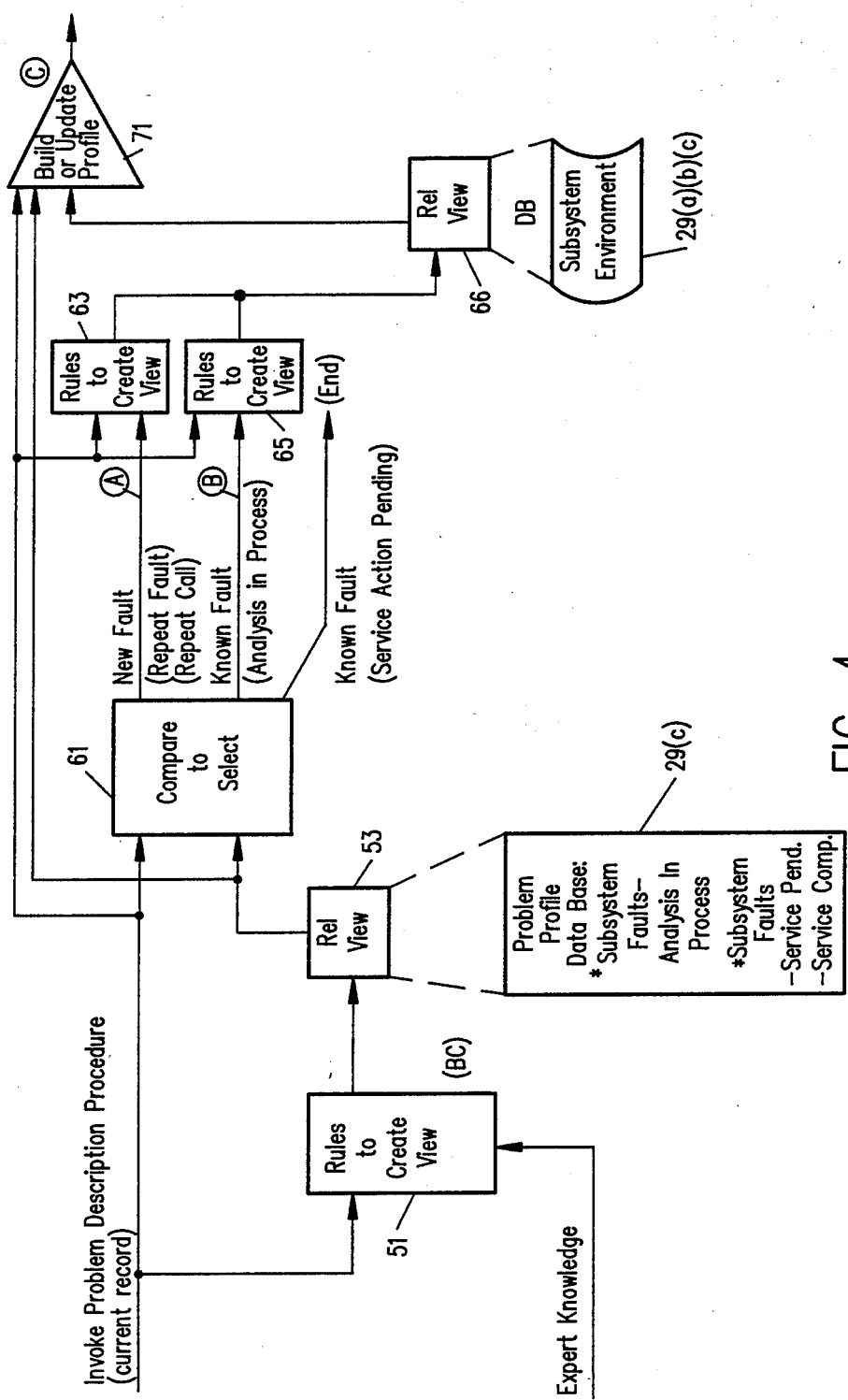
FIG. 4 is a block diagram conceptually illustrating the application of the Problem Description Procedure.

Illustrated conceptually in FIG. 4 is the mechanism to implement the Problem Description Procedure. The Problem Description Procedure is described in the pseudo code listing of Appendix 2.

The current error event record, when passed to the Problem Description Procedure by the Invoke Problem Description Procedure signal, is applied to a set of rules 51 that are part of the problem procedures 29(e) and create a relational view 53 of the Problem Profile data base 29(c) of exception records of subsystem faults for which analysis is in progress for which service is pending or completed. This relational view insures that only the portion of the data base that relates to the current error event under consideration is used when applying the selection rules to the current error event. Again, this is to reduce the computational effort required in the selection. As before, the rules 51 to create the view 53 are generated with expert knowledge as to the factors relating to the particular subsystem and devices in which the service alert function is contained regarding what types of error events might be related or connected.

The selection processor 61 compares the current exception record to the relational view of the Problem Profile data base 29(c) to select one of:
 (a) new fault;
 (b) repeat fault;
 (c) repeat call;
 (d) known fault (analysis in progress); or
 (e) known fault (service action pending).

If the current exception record represents a new fault, a status indicator or control signal is placed on the line A. The Build/Update Problem Profile procedure is then invoked, and the signal on the line A becomes a command to analyze for a new fault.

If a link to an existing Problem Profile record is found for which analysis is in progress (the fault has not been reported to the host system yet), a control signal or status indicator is placed on the line B. The Build/Update Problem Profile procedure is then invoked, and the signal on the line B becomes a command to analyze for a known fault.

If the comparison determines that the current exception record represents a repeat fault or a repeat call, the selection rules cause a control signal to be placed on the output line A. A repeat fault is a fault for which a service alert message was sent to the host system, but a service action has not been initiated. A repeat call is a fault for which a service action has been completed, indicating that the service action was not successful. Although a repeat fault or a repeat call means record of the fault exists in the Problem Profile data base, that Problem Profile data is old history, which should not be used currently by the Problem Evaluation procedure. Therefore, the Build/Update Problem Profile Procedure builds a new Problem Profile record as though the current exception were a new fault. Further analysis is done by invoking the Problem Evaluation Procedure.

If the comparison finds a link between the current exception event record and a Problem Profile record for which a service action is pending, the recurrent problem counter in the Problem Profile record is incremented and the Problem Description Procedure is ended. In this event, the Problem Evaluation Procedure is not invoked.

BUILD/UPDATE PROBLEM PROFILE PROCEDURE

The Build/Update Problem Profile Procedure is invoked as a subroutine of the Problem Description Procedure. The procedure is used to build a Problem Profile record for the Problem Profile data base when no Problem Profile record is found in the data base to match the current exception record, and to update the Problem Profile record when a Problem Profile record is found in the data base to match the current exception record.

The Problem Profile records in the Problem Profile data base 29(c) preferably have a common record format. Different bytes in the record indicate if an analysis is in progress for the fault represented by that Problem Profile record, or if a service action is pending, or if a service alert message has been transmitted to the host system, or if a service action has been completed, or other information relevant to the analysis and treatment of subsystem faults.

The Build Problem Profile Record Procedure is illustrated as element 71 (FIG. 4), and is described more fully in the pseudo code listing of Appendix 3. This procedure builds or updates a Problem Profile record in the Problem Profile data base 29(c).

The current exception or Problem Profile record is applied to the Build Problem Profile Record Procedure. If a known fault for which analysis is in progress is involved, the updated Problem Profile record from the Problem Profile data base (not including the current exception record) is applied to the Build Problem Profile Record Procedure so that it can be updated with the current Problem Profile (exception) record. The control signal for a known fault (analysis in progress) causes a set of rules 65 to be invoked to create a view 66 of the Subsystem Environment data base 29(a)(b)(c) relevant to the current exception. The viewed data is provided to the Build/Update Problem Profile Procedure 71, along with the current record and the existing Problem Profile record from the Problem Profile data base 29(c). After the Problem Profile record has been updated, the process then returns to the point in the Problem Description Procedure at which the Problem Evaluation Procedure (Profile Record, Recurrent Problem) is invoked.

If the current exception record is for a new fault, a Problem Profile record is built with the Build Problem Profile Record Procedure 71. The control signal for a new fault causes a set of rules 63 to be invoked to create a view 66 of the Subsystem Environment data base 29(a)(b)(c) relevant to the current exception. The viewed data is provided to the Build/Update Problem Profile Procedure 71, along with the current record. For a new fault, no existing Problem Profile record exists in the Problem Profile data base 29(c). After the Problem Profile record is built, the process returns to the Problem Description Procedure at the point at which the Problem Evaluation Procedure (Profile Record, New Problem) is invoked.

If the current exception record is for a repeat fault, the Problem Profile record is created as for a new fault, after which the process returns to the Problem Description Procedure at the point at which the Problem Evaluation Procedure (Profile Record, Repeat Alert) is invoked.

If the current exception record is for a repeat call, a Problem Profile record is also built as for a new fault, after which the process returns to the point in the Problem Description Procedure at which the Problem Evaluation Procedure (Profile Record, Repeat Call) is invoked.

PROBLEM EVALUATION PROCEDURE

Figure 5:
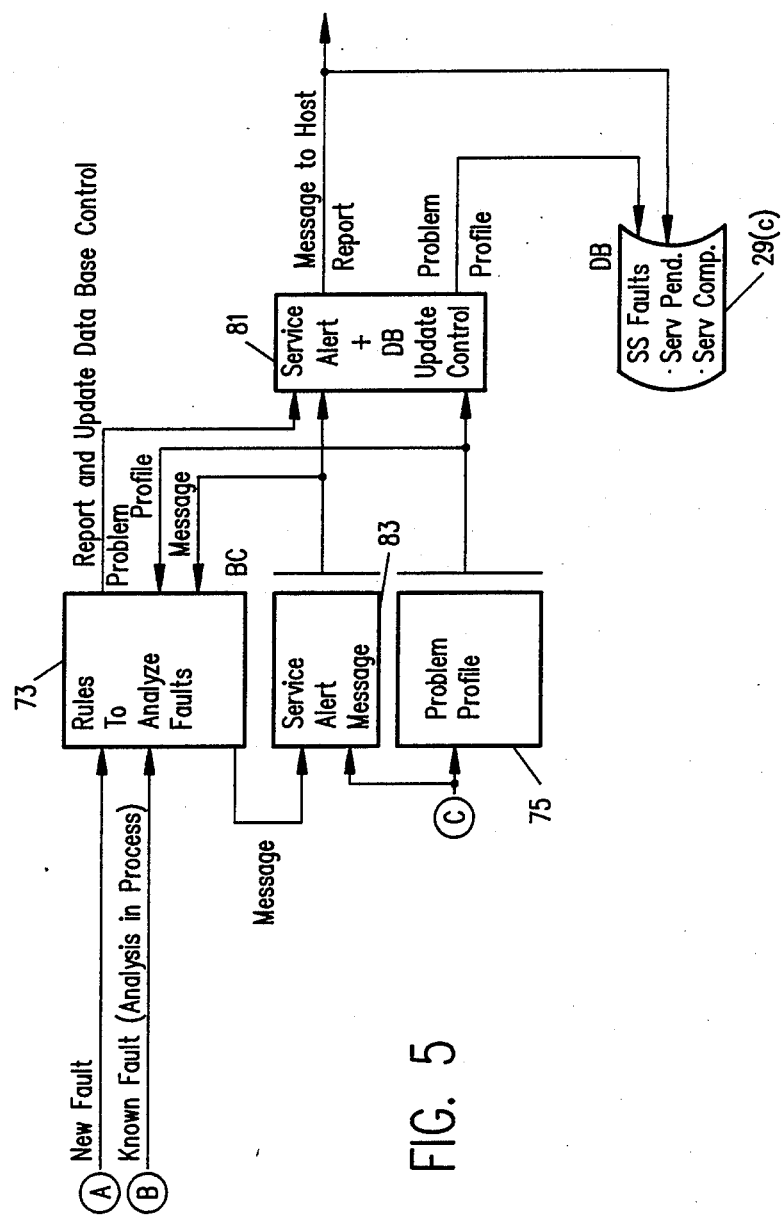
FIG. 5 is a conceptual block diagram conceptually illustrating the application of the Problem Evaluation Procedure.

The Problem Evaluation Procedure is illustrated schematically in FIG. 5, and is described in the pseudo code listing of Appendix 4.

The Problem Evaluation Procedure is invoked when the Profile Record input parameter contains new problem information to be evaluated. The evaluation task is to determine appropriate service action requirements for the problem condition and determine if a service action should be initiated for problem resolution.

The problem evaluation process is RULE driven, such that information within the Problem Profile Record determines both RULE selection and RULE products. Information produced by RULE execution is JOINED with the Profile Record to become part of the Problem Profile data base. The result is a data base record that describes both the problem and the results of problem analysis.

If the evaluation process determines that service action is not (yet) required, the updated Problem Profile Record is returned to the Problem Profile data base. A subsequent invocation of the service analysis message process may update and re-evaluate the problem again. Otherwise the record will eventually be purged from the data base.

A set of rules 73 is installed to analyze the faults. The rules 73 are applied to the Problem Profile record (updated) received from the Build/Update Problem Profile 71 (see FIG. 4). If the current fault is a known fault for which analysis is in progress, a service alert message is 25 contained in the Problem Profile record. That service alert message is placed in the message data space 83, from which it is read to the analysis rules 73. The control commands on the lines (A) or (B) instruct the rules 73 whether to analyze for a new fault (including repeat faults and repeat calls), or analyze for a known fault for which analysis is in progress. For a new fault, the rules will generate a service alert message to read into the message data space 83. For a known fault, the rules will modify the existing message read from the data space 83 and read the new message back in the space.

The rules 73 isolate the fault, determine the fault severity, and determine a recommended service action. Output from the rules is a report and update data base control information, which are applied to the service alert and data base update control 81.

The service alert and data base update control 81 receives the report from the rules to analyze faults 73, and the service alert message. The output from the fault analysis rules 73 determines whether the service alert and data base update control 81 forwards service alert message report to the host, or whether it is simply returned to the Problem Profile data base 29(c) to be a part of the observation for future faults. If the report is to be sent to the host, then the Problem Profile data base is also augmented with that report.

If the Problem Evaluation process concludes that a service action is required, a procedure is called to generate service analysis message Sense Data for an appropriate service analysis text message. Service analysis message Sense Data is JOINED with the Problem Profile Record and also presented to a host system.

Although the present invention has been described in connection with a particular embodiment, modifications and variations will be apparent to those skilled in the art.

Appendix 1

PROCEDURE Problem Detection (Input Log Record)

(* The Service Alert Message Generate process requires the
subsystem to periodically report path and device usage count
values, and to report changes in subsystem configuration and
exception events as they occur.  Information is reported in
the form of a log record, where any log record consists of
the components:
        Log Type, Log Source, Log Data and Time Stamp *)

```
INSERT   (Input Log Record)
   INTO Subsystem Environment.Next Record
   VALUES (Log Type, Log Source, Log Data, Time Stamp)

Current Record := Next Record
Next Record    := Next Record +1

CASE Current Record.Log Type OF
   Device Usage Report
      UPDATE Log Source (Usage Statistics)
         (* Use Current Record and Log Source.Previous Record
            to update current and term usage rate values for:
            path access, motion seek, data write and data
            read. *)

Changed Subsystem Configuration
      UPDATE Log Source (Vital Configuration Data)
         (* Use the Current Record to determine how the
            configuration has changed; verify change validity;
            and update appropriate configuration data records.
            *)

Exception Event (type = 'soft')
        SELECT   Time Stamp, Exception Symptom, Symptom
                 Domain, Fault Pattern
        FROM     Subsystem Environment
        WHERE    The Exception Data Relation RULE is
                 determined from:
                 Current Record (Log Data.Symptom * Log
                 Source.Boundary)

UPDATE Current Record (Fault Pattern)
           (* The current record is updated to include a
              fault pattern description derived from the
              data base relational view.
              A fault pattern is characterized by:
              Symptom Profile, Fault Incidents, Fault
              Period. *)

IF Fault Pattern > Symptom (Threshold Criteria)
         THEN GOTO Problem Description (App. 2)

Exception Event (type = 'hard')
      GOTO Problem Description (App. 2)
   END (of case)
END. (Procedure Problem Detection)
```

Appendix 2

```
PROCEDURE Problem Description (Current Record)
 (* This procedure attempts to link the Current Record to a
    Profile Record already generated for a previous
    occurrence of the same problem. If the link is
    successful, and depending on Profile Record.Status, the
    profiles are updated to reflect new information from
    Subsystem Environment. Otherwise, a new Profile Record
    is generated. *)

SELECT Profile Record (*.ID, *.Status)
   FROM Problem Profile
     WHERE The Profile Record Relation RULE is determined from:
         Current Record (Log Data.Symptom * Log
         Source.Boundary)

CASE Select Results OF
    Empty Set (* No history link found *)
       Build Profile (Current Record) (App.3)
          (* Procedure creates a Current Record relational
             view of Subsystem Environment. Patterns for a
             new Profile Record are constructed from
             information within the view. *)

GOTO Problem Evaluation (Profile Record, New Problem)

Link Found (*.Status = Not Reported To System) (analysis
    in progress)
       Update Profile (Current Record, Profile Record) (App.3)
          (* Procedure creates a Current Record relational
             view of new (since *.ID) Subsystem Environment
             data base entries. Profile Record patterns are
             updated from information within the view. *)

GOTO Problem Evaluation (Profile Record, Recurrent
            Problem)

Link Found (*.Status = Service Action Pending)
       Profile Record.Recurrent Problem Count := *.* +1
          (* Maintain count of repeated exception events. *)

Link Found (*.Status = No Service Response) (Repeat Fault)
       Update Profile (Current Record, Profile Record) (App.3)
          (* Update service alert message and report again to
             system. *)

GOTO Problem Evaluation (Profile Record, Repeat Alert)

Link Found (*.Status = Service Action Complete) (Repeat
    Call)
       Build Profile (Current Record) (App.3)
          (* Service action not successful. Build new service
             alert message for Support Trained CE service
             action. *)

GOTO Problem Evaluation (Profile Record, Repeat Call)
    END
 END. (Procedure Problem Description)
```

Appendix 3

PROCEDURE Build Profile (Current Record)

INITIALIZE Profile Record (Time Stamp = Null)
(* Prepare to build new Profile Record. *)

PROCEDURE Update Profile (Current Record, Profile Record)

(* This procedure builds or updates a Profile Record that
   represents a Current Record relational view of Subsystem
   Environment. *)

```
SELECT  SCU Config, String Config, Device Config
  FROM  Subsystem Environment (Time Stamp > Profile
        Record.Time Stamp)
 WHERE  The Configuration Data Relation RULE is determined
        from: Current Record (Log Data.Symptom * Log
        Source.Boundary)

PROFILE (* Subsystem channels, SP controllers, string
         path controllers, spindles, devices and model/feature
         characteristics installed and operational (not
         fenced) within the "relevant" subsystem boundary. *)

SELECT  SP Use, String Use, Path Use, Spindle Use, Device Use
  FROM  Subsystem Environment (Time Stamp > Profile
        Record.Time Stamp)
 WHERE  The Usage Statistics Relation RULE is determined
        from: Current Record (Log Data.Symptom * Log
        Source.Boundary)

PROFILE (* Usage patterns for subsystem components that
               are installed and operational within the
               "relevant" subsystem boundary. *)

SELECT  ERP Action, ERP Resource, ERP Result
  FROM  Subsystem Environment (Time Stamp > Profile
        Record.Time Stamp)
 WHERE  The ERP Data Relation RULE is determined from:
        Current Record (Log Data.Symptom * Log
        Source.Boundary)

PROFILE (* Results of exception recovery actions invoked
         for "relevant" exceptions, and using components
         within the "relevant" subsystem boundary. *)

SELECT  Command Exception, Exception Symptom, Sub-Symptom
        Parameters, Symptom Domain, Power Status
  FROM  Subsystem Environment (Time Stamp > Profile
        Record.Time Stamp)
 WHERE  The Exception Data Relation RULE is determined from:
        Current Record (Log Data.Symptom * Log
        Source.Boundary)
```

PROFILE (* Syndrome patterns detected for "relevant"
  exceptions, and using components within the
  "relevant" subsystem boundary. Profile
  patterns provide cross-point-isolation to
  probable failure mode(s) and probable failure
  boundary(s). *)

Profile Record.Time Stamp := Current Time

END  (procedure Build/Update Profile) (Return to Procedure
  Problem Description)

Appendix 4

PROCEDURE Problem Evaluation (Profile Record, Status)

(*  This procedure processes information in the Profile
  Record to generate Service Requirements for the detected
  problem.  Subsequently, service alert message Sense Data
  is generated and reported to a host system IF the Service
  Requirements indicate that the detected and evaluated
  problem requires service attention.  Problem evaluation
  information generated by this procedure is JOINED with
  the Profile Record and stored in the Problem Profile data
  base. *)

LOAD RULE Set for Profile Record.Exception Class Group
(* Exception Class Group identifies the failing DAS function.
  The RULE Set will be executed to determine service action
  requirements. *)

EXECUTE RULE Set.Fault Isolate
  PROFILE Isolate Status INTO Profile Record.Service
  Requirements
    Isolate Certainty  = SET OF 1..10
    CE Diagnose Proc   = SET OF 1..n
    Primary FRU        = None ] SET OF 1..n
    Secondary FRU      = None ] SET OF 1..n
    Media Defect Site  = None ] Media Address (Boundary
                                Parameter)
    Media Maint Proc   = None ] SET OF 1..n (* RULE Set processes Profile Record data to select the
  recorded fault syndrome pattern with highest significance.
  For Example:  evidence of a power fault syndrome takes
  precedence over any logic fault syndrome that might also
  be recorded; or evidence of a logic or analog fault
  syndrome takes precedence over a data fault syndrome that
  might also be recorded.

Minimum Isolate Status is Isolate Certainty = 1 and
  reference to a CE Diagnose Procedure.
  Maximum Isolate Status is Isolate Certainty = 10 and
  reference to a single Primary FRU or Media Defect Site. *)

```
EXECUTE RULE Set.Fault Severity
   PROFILE Severity Status INTO Profile Record.Service
   Requirements
      Permanence  = SET OF (Hard, Soft)
      Persistence = SET OF (Event, Burst, Recurrent,
                    Intermittent)
      Disruption  = SET OF (None, Support, Channel, Path,
                    Device, Data)
      Scope       = SET OF 0..n (* RULE Set processes Profile Record data to determine
   Severity Status for the fault syndrome determined by Fault
   Isolate.
   Severity Status is added to the Profile Record. *)
EXECUTE RULE Set.Service Action
   PROFILE Service Status INTO Profile Record.Service
   Requirements
      Service Status = SET OF (Probable Fault, Repair Fault)

(* This RULE Set processes the procedure input parameters
   (New Problem, Recurrent Problem, Repeat Alert, Repeat
   Call), along with Isolate Status and Severity Status so as
   to determine the course of action for this Profile Record.
   *)

CASE Service Status OF
   Probable Fault
      UPDATE Profile Record (Problem Status := Analysis In
      Process)
         (* The service alert message process for the Current
         Record is terminated by returning the Profile Record
         to the Problem Profile data base. If the problem
         recurs, the recursive process of update and
         re-evaluation is invoked again. If the problem does
         not recur within a specified period, then the
         Profile Record is purged from the Problem Profile
         data base. *)
   Repair Fault
      UPDATE Profile Record (Problem Status := Problem
      Reported)
      Generate service alert message (Profile Record.Service
      Requirements)
         JOIN service alert message Sense Data INTO Profile
         Record.Service Alert Message
      Report service alert message to host (Profile
      Record.Service Alert Message)
         (* The service alert message process for the Current
         Record is terminated by generating a service alert
         message Sense Data record from information in the
         Profile Record. Service alert message Sense Data is
         then sent to a host system so as to initiate the
         machine service process. The reporting process is
         repeated at a specified interval until service
         action is initiated, or until the a specified
         reporting window has expired. *)
   END
END. (Procedure Problem Evaluation)
```

What is claimed is:

1. In a computer peripheral subsystem connected to a host computer system, a method of automatically detecting and analyzing exception events occurring in said peripheral subsystem comprising:

maintaining a Subsystem Environment data base comprising information relating to the current configuration of said computer peripheral subsystem and usage and error information relating to said peripheral subsystem;

conditionally invoking a Problem Description procedure when the data in said Subsystem Environment data base reflects an exception event that indicates either a clear or a probable need for service attention to said peripheral subsystem, said Problem Description procedure comprising:

creating from stored rules a view of said Subsystem Environment data base relevant to said exception event;

developing a current Problem Profile record describing said exception event;

scanning a Problem Profile data base comprising Problem Profile records of previously occurring exception events to relate said current Problem Profile record to a Problem Profile record that already exists in said Problem Profile data base;

if said current Problem Profile record matches an existing Problem Profile record in said Problem Profile data base, and said existing Problem Profile record indicates that a service action is pending for the covered problem, updating said existing Problem Profile record;

if said current Problem Profile record matches an existing Problem Profile record in said Problem Profile data base, and said existing Problem Profile record indicates that a service action is not pending for the covered problem, updating said existing Problem Profile record and invoking a Problem Evaluation procedure;

if said current Problem Profile record does not match an existing Problem Profile record in said Problem Profile data base, adding said current Problem Profile record to said Problem Profile data base;

wherein said Problem Evaluation procedure comprises:

examining said current Problem Profile record in view of stored rules relating to acceptable subsystem performance; and if operations of said peripheral subsystem have been disrupted or degraded beyond the limits of acceptable subsystem performance, generating a service alert message, and inserting said service alert message into said Problem Profile record, updating said existing Problem Profile record in said Problem Profile data base, and transmitting said service alert message to said host system.

2. The method of claim 1, wherein said step of conditionally invoking said Problem Description procedure comprises examining said Subsystem Environment data base in view of rules describing normal performance and possible exception events.

3. The method of claim 2, wherein said step of conditionally invoking said Problem Description procedure additionally comprises examining the data regarding said exception event to determine if said exception event is a soft event or a hard event, and wherein:

if said exception event is a hard event, invoking said Problem Description procedure; and if said exception event is a soft event, examining said exception event against a set of rules to determine if a threshold criterion has been exceeded, and invoking said Problem Description procedure if said threshold criterion has been exceeded.

4. The method of claim 3, wherein said step of examining said exception event against a set of rules to determine if a threshold criterion has been exceeded comprises examining said exception event against a subset of rules relating to the type of exception event and the portion of said computer peripheral subsystem relating to said exception event.

5. The method of claim 4, wherein determining if a threshold criterion has been exceeded comprises determining that a trend of related exception events have been detected within a common portion of said computer peripheral subsystem.

6. A computer peripheral subsystem for connection to a host computer system, comprising:

an input/output device connected for receiving operation commands and data from said host computer system;

an error detection and recovery system comprising means for detecting exceptions in the operation of the input/output device and attempting recovery of such error events;

memory for maintaining a Subsystem Environment data base relating to the computer peripheral subsystem, including data on the physical configuration of said computer peripheral subsystem, a subsystem usage log, an exception log, fault criteria, and problem procedures;

means for updating the subsystem usage log and the exception log in response to usage and exception information generated by said input/output device and said error detection and recovery system;

means for testing data received by said subsystem usage log and said exception log against said stored fault criteria;

means for characterizing the subsystem physical configuration, the subsystem usage log, and the exception log for the current fault type; and means for analyzing the data with the problem procedures to determine if a service action is required.

7. The computer peripheral subsystem of claim 6 additionally comprising:

means for determining the service requirements if a service action is determined to be required; and means for storing in said memory a service alert record comprising a record of the service actions called for.

8. The computer peripheral subsystem of claim 7 additionally comprising means for sending to said host computer system a message when a service action is required.

9. In a computer peripheral subsystem connected to a host computer system, a method of automatically detecting and analyzing exception events occurring in said peripheral subsystem, the computer peripheral subsystem including an input/output device connected for receiving operation commands and data from said host computer system, and an error detection and recovery system comprising means for detecting error events in the operation of the input/output device and attempting recovery of such exception events, the method comprising:

storing in a memory a Subsystem Environment data base relating to said computer peripheral subsystem, including data on the physical configuration of said computer peripheral subsystem, a subsystem usage log, an exception log, fault criteria, and problem procedures;

updating the subsystem usage log and the exception log in response to usage and exception event information generated by said input/output device and said error detection and recovery system;

when a current exception is detected, testing data received by said subsystem usage log and said exception log against said stored fault criteria;

characterizing the subsystem physical configuration, the subsystem usage log, and the exception log for said current exception; and analyzing the characterized data with said problem procedures to determine if a service action is required.

10. The method of claim 9 additionally comprising:
determining the service requirements if a service action is determined to be required; and
storing in said memory a service alert record comprising a record of the service actions called for.

11. The method of claim 10 additionally comprising sending to said host computer system a message when a service action is required.

* * * * *